June 24, 1930.  J. BINDERUP  1,766,010
FORCE PUMP
Filed Nov. 12, 1926   3 Sheets-Sheet 1
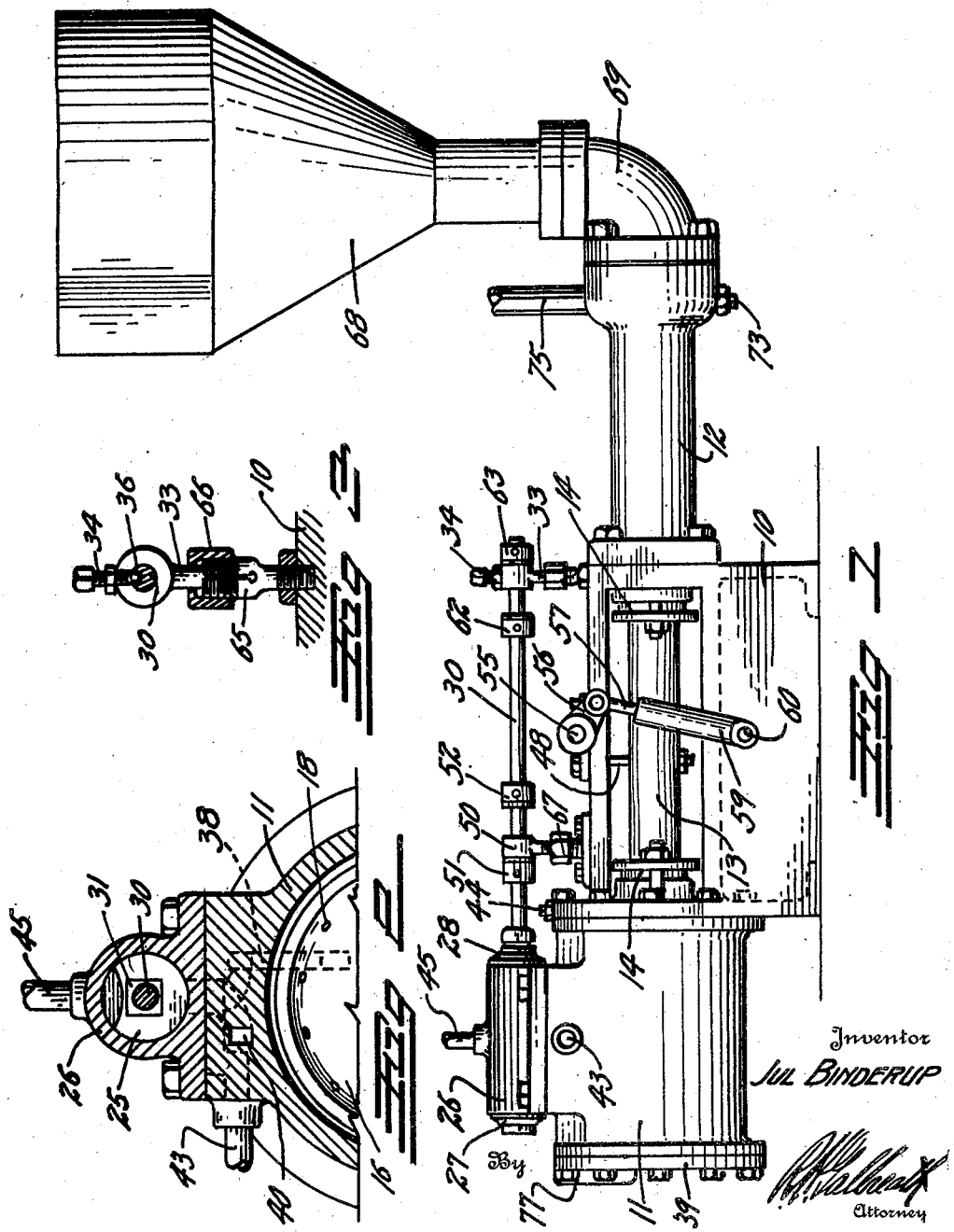
Inventor
JUL BINDERUP

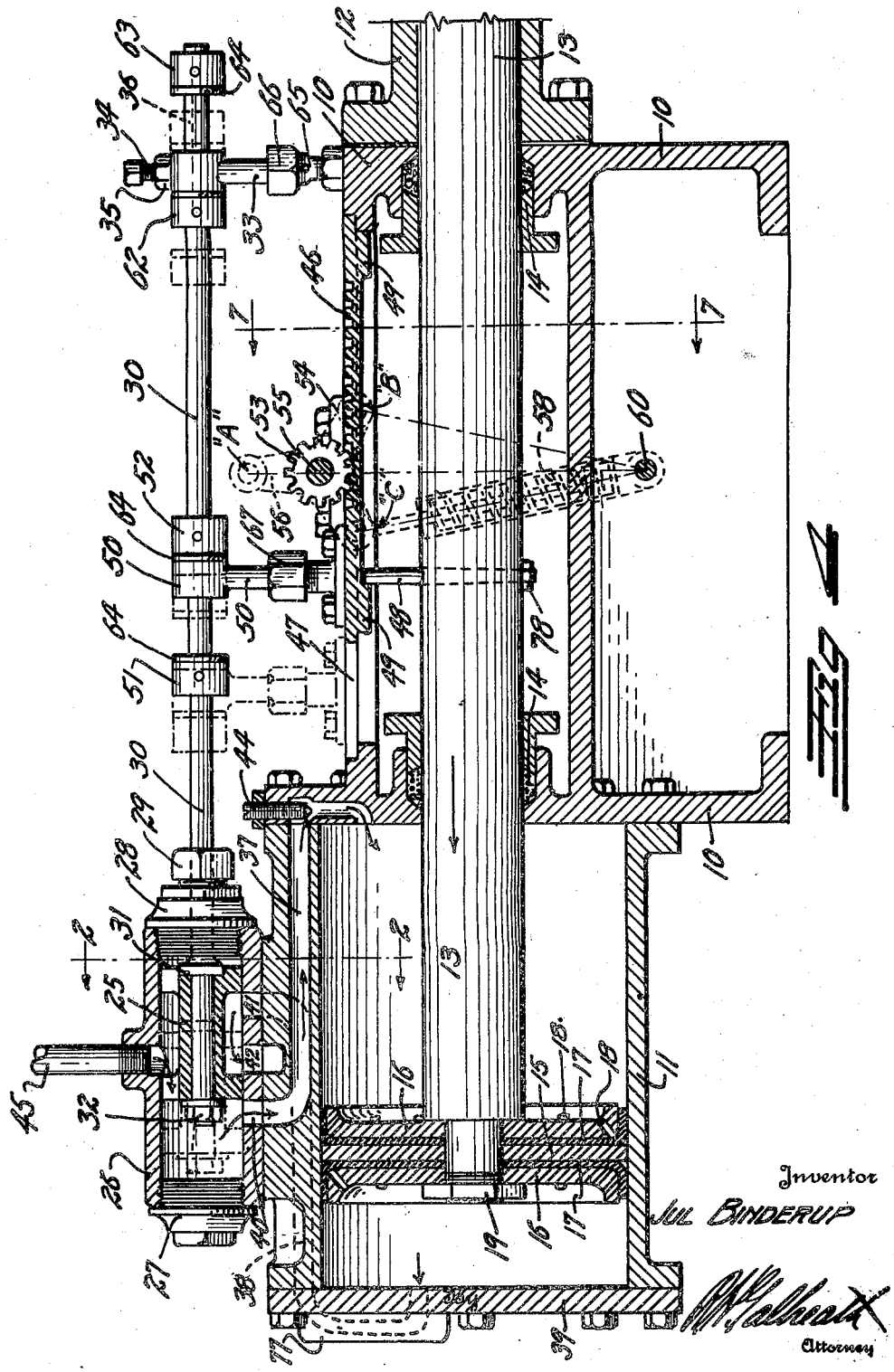

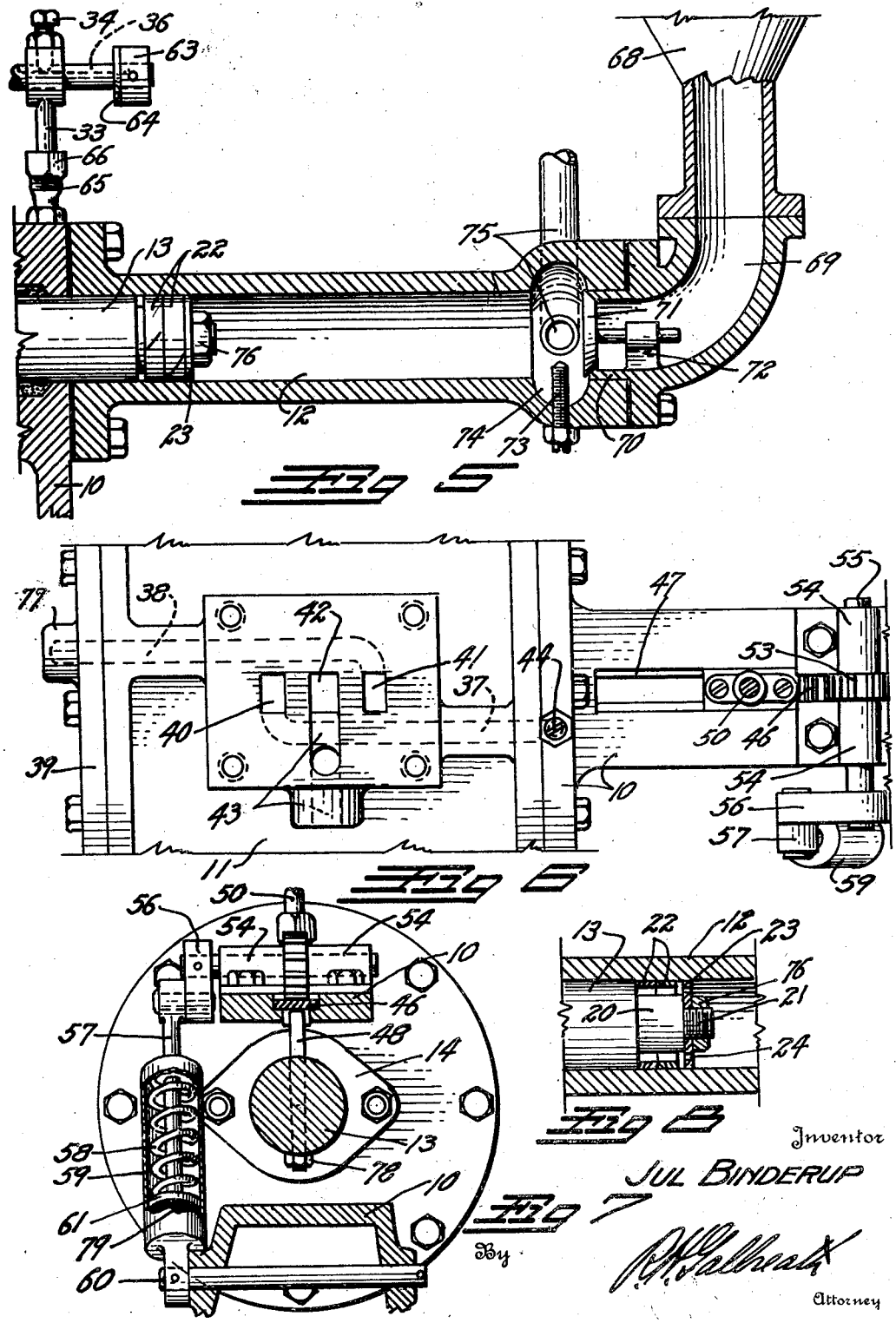

Patented June 24, 1930

1,766,010

UNITED STATES PATENT OFFICE

JUL BINDERUP, OF DENVER, COLORADO

FORCE PUMP

Application filed November 12, 1926. Serial No. 147,930.

This invention relates to a grease force pump, for use in automobile service stations and the like, of the type adapted to maintain grease under pressure in hose lines which may be attached to the various greasing nipples of automobiles.

The principal object of the invention is the provision of a force pump which may be operated from the compressed air system of the station and which will have a positive and quick acting valve action which will allow the control valves to remain open for substantially the full length of the stroke of the pump plunger.

Another object of the invention is to provide a grease piston which will insure a positive seal and which will not force the grease through the plunger packing.

A further object of the invention is to provide an air piston in which the pressure of the air acts to positively seal the piston to the cylinder walls.

A still further object is to provide an intake check valve for the grease, which will be easily accessible, simple in construction, and independent of springs.

Other objects and advantages reside in the detail construction of the invention, which is designed for simplicity, economy and efficiency. These will become more apparent from the following description.

In the following detailed description of the invention reference is had to the accompanying drawings which form a part hereof. Like numerals refer to like parts in all views of the drawing and throughout the description.

In the drawings:

Fig. 1 is a side elevation of the complete pump.

Fig. 2 is a vertical section through the air valve box, taken on the line 2—2, Fig. 4.

Fig. 3 is a detail view of the valve rod support.

Figs. 4 and 5 together form an enlarged vertical, longitudinal section through the pump. These figures are continuations of each other.

Fig. 6 is a fragmentary plan view of the air cylinder with the valve box removed, Fig. 7 is a vertical section taken on the line 7—7, Fig. 4.

Fig. 8 is a detail view of the grease piston.

The invention comprises a supporting frame 10, which carries at one end an operating or air cylinder 11, closed by a cylinder head 39, and at the other side a grease cylinder 12. A piston rod 13 extends through the frame 10 from within the air cylinder 11 into the grease cylinder 12, through suitable packing glands 14.

Within the air cylinder 11, the piston rod 13 terminates in a piston formed of a central disk 15 and two external dished disks 16. Between the disks 15 and 16, circular sheets of packing 17 are compressed by means of a nut 19 which is threaded on the piston rod 13. The sheets of packing 17 are turned backward at the cylinder walls over the edges of the disks 16. The disks 16 are drilled with diagonal holes 18. As the air pressure increases on one side of the piston it will flow through the holes 18 and place pressure behind the packing sheet 17 at the points where it contacts with the cylinder wall. This pressure serves to tightly force the packing against the wall and seals the piston from leakage.

Within the grease cylinder 12, the piston rod 13 is turned to a smaller diameter, as shown at 20, and terminates in a threaded extremity 21 for a nut 76. Piston rings 22 surround the portion 20 and are prevented from leaving the piston rod by a disk 23 in which perforations 24 are formed. The width of the piston rings 22 is less than the length of the portion 20 so that the rod may move a limited distance without moving the rings. As the piston rod moves against the grease pressure the grease will be forced through the perforations 24 into the space between the portion 20 and the piston rings, creating a pressure in back of the rings which will force them tightly against the piston walls and prevent grease from escaping along the piston rod. As the piston moves in the opposite direction, away from the grease, the piston rings will move to a position against the disk 23 and scrape grease from the walls in behind the rings and through the perforations 24 back into the cylinder. This construction prevents grease from working along the piston rod and being forced through the packing gland 14.

The flow of the air to opposite sides of the air piston is controlled by means of a slide valve 25 which slides within a cylindrical valve box 26 attached to the top of the air cylinder 11. Access may be had to the valve box by removing a cap 27 which is threaded into one extremity thereof. A packing gland cap 28 is threaded into the other extremity of the valve box and carries a packing gland 29, through which, a valve rod 30 is arranged to operate the slide valve 25.

The slide valve 25 is, of course, cylindrical in contour to fit snugly within the cylindrical valve box 26. To prevent it rotating within the valve box, a squared shoulder 31 is formed on the valve rod 30 so as to engage a squared depression in the slide valve, it being held in place therein by means of a slide valve nut 32. This construction prevents the slide valve from rotating on the valve rod. The outer extremity of the valve rod is slidably carried in a valve rod support 33 and is prevented from rotating therein by means of a set screw 34, that projects into a longitudinal groove 36 in the valve rod. The set screw 34 may be locked in position by means of a suitable lock nut 35.

A passage 37 communicates from a port 40 in the valve box 26 through the wall of the cylinder 11 and the frame 10 to the piston rod side of the air cylinder. A similar passage 38 communicates from a port 41 in the valve box 26 through the wall of the cylinder 11 and the head 39 to the head end of the cylinder 11. The passages 37 and 38 cross each other within the wall of the cylinder so that they terminate in the valve box 26 oppositely from their terminations in the cylinder.

Between the ports 40 and 41 an exhaust port 42 is placed which communicates through an exhaust passage 43 to the exterior of the cylinder. The action of the slide valve on the ports 40, 41 and 42 is similar to all slide valve actions employed in steam engines and the like, and it is not believed necessary to describe its action here.

The amount of air which may enter the cylinder through the passage 37 or exhaust therethrough is controlled by means of a needle valve 44 which acts as a throttle valve by means of which the operating speed of the pump may be set. Air under pressure is fed into the valve box through a supply pipe 45.

A rack 46 is arranged to slide in a track 47 in the frame 10 immediately over and parallel with the piston rod 13. The rack 46 is moved by a pin 48 which is carried by the piston rod and arranged to engage projections 49 at the extremities of the rack. The pin 48 is tapered within the piston rod and is held in place therein by a clamp nut 78. The pin 48 rides in the track 47 between the extremities of the rack and prevents the piston rod 13 from rotating. A standard 50 is carried by the rack which, at its upper extremity, surrounds the valve rod 30 between stops 51 and 52 secured thereon.

A pinion 53 meshes with the rack 46 and is secured to a pinion shaft 55, carried in bearings 54 on the frame 10. The pinion shaft 55 terminates in a lever 56 arranged to draw upon a spring rod 57 which terminates in a piston 61 within a spring sleeve 59 pivoted to the frame 10 at 60. A compression spring 58 surrounds the spring rod 57 within the spring sleeve 59 so as to be compressed between the piston 61 and the head of the spring sleeve. A rubber cushion 79 is placed in the bottom of the spring sleeve to receive the return impact of the piston 61.

The operation of this mechanism is as follows:

Assuming the piston rod 13 to be traveling to the left, or in the direction of the arrow, Fig. 4. It will move independently until the pin 48 strikes the projection 49 on the rack 46 (as shown in solid line, Fig. 4) and will then carry the rack 46 with it. As the rack moves the lever 56 will raise, compressing the spring 58 until it reaches dead center or position "A", Fig. 4. The spring 58 will now expand and jerk the lever 56 to the position "B", Fig. 4. This causes the pinion 53 to quickly move the rack 46 so that the standard 50 will engage the stop 51 and move the valve rod 30 and the slide valve 25 to the reverse position. The port 41 and the passage 38 will then be opened to the pressure in the valve box, while the port 40 and the passage 37 will be opened to the exhaust port 42. This places the air pressure against the head of the piston and allows air from the opposite side of the piston to exhaust controlled by the needle valve 44. The piston now moves to the right or opposite to the arrow of Fig. 4, until the pin 48 engages the projection 49 at the opposite end of the rack 46. The rack will now again move the lever 56 to the dead center or "A" position from where it will be jerked to the position "C", Fig. 4, thus causing the valve mechanism to be again placed in the solid line position of Fig. 4.

The travel of the slide valve and its operating mechanism is limited by stops 62 and 63 carried by the valve rod which engages the valve rod support 33 at the limits of travel of the valve rod. The stops 51, 52, 62 and 63 are each provided with cushions 64, of leather or the like, to absorb the impact caused by the action of the spring.

Provision is made for properly aligning the valve rod 30 with the valve box 26 by adjustably mounting the valve rod support 33 in a split socket 65, in which it may be clamped at any desired elevation by means of a clamp nut 66, as shown in Fig. 3. The standard 50 is similarly adjustable and is maintained in adjustment by a clamp nut 67.

Grease is fed to the grease cylinder 12 from a grease hopper 68 which is carried on an elbow 69 from the extremity of the grease cylinder 12. The elbow 69 is provided with a sleeve 70 which extends within the grease cylinder 12 and forms a seat for a check valve 71, the stem of which is slidable in a support 72, within the elbow. The amount of opening of the valve 71 is limited by a stop screw 73 which is threaded through the cylinder 12 sufficiently far to be in the path of travel of the valve 71. The cylinder 12 is enlarged, as shown at 74, immediately before the valve 71 to allow space for the grease to pass around the valve 71 when it is in the open position.

As the piston rod 13 withdraws from the cylinder 12, the valve 71 will open and allow the grease to fill the vacated space. As the piston rod moves into the cylinder 12 the valve 71 will be forced to its seat and the grease will be forced from the cylinder through a grease discharge 75.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. In a motor having an operating cylinder and a piston rod extending from a piston within said cylinder; a valve box carried by said cylinder; a slide valve within said valve box adapted to control passages from said box to opposite ends of said cylinder; a valve rod extending from said valve box substantially parallel to said piston rod; a projection on said piston rod; means for communicating motion from said projection to said valve rod, said means comprising a movable standard; stops on said valve rod adapted to be engaged by said standard; and means for causing said standard to be operated from said projection, said means comprising contacts adapted to move with said standard and be engaged by said projection only at the extremities of its travel and a spring arranged to move said standard beyond the extremities of travel of said projection after the initial movement has been imparted by said projection.

2. In a motor having an operating cylinder and a piston rod extending from a piston within said cylinder; a valve box carried by said cylinder; a slide valve within said valve box adapted to control passages from said box to opposite ends of said cylinder; a valve rod extending from said valve box substantially parallel to said piston rod; a pin projecting from said piston rod; a member arranged to slide substantially parallel with said piston rod; projections on said member adapted to be engaged by said pin when said piston approaches the limits of its travel, said member remaining at rest until engaged by said pin; a standard carried by said member; and stops on said valve rod adapted to be engaged by said standard, a spring arranged to move said member beyond the limit of travel of said pin; and means for bringing said spring into action when said pin engages said member.

3. In a motor having an operating cylinder and a piston rod extending from a piston within said cylinder; a valve box carried by said cylinders; a slide valve within said valve box adapted to control passages from said box to opposite ends of said cylinder; a valve rod extending from said valve box substantially parallel to said piston rod; a pin projecting from said piston rod; a rack arranged to slide substantially parallel with said piston rod; projections on said rack adapted to be engaged by said pin when said piston approaches the limits of its travel; a standard carried by said rack; stops on said valve rod adapted to be engaged by said standard; a pinion arranged to mesh with said rack; a lever operated from said pinion; and a spring arranged to resist the movement of said lever for a portion of its travel and assist its movement for another portion thereof so as to cause said rack to have a more extended movement than said pin.

4. In a pump having an operating cylinder and a piston rod extending from a piston within said cylinder; a valve box carried by said cylinder; a slide valve within said valve box adapted to control passages from said box to opposite ends of said cylinder; a valve rod extending from said valve box substantially parallel to said piston rod; a pin projecting from said piston rod; a rack arranged to slide substantially parallel with said piston rod; projections on said rack adapted to be engaged by said pin when said piston approaches the limits of its travel; a standard carried by said rack; stops on said valve rod adapted to be engaged by said standard; a pinion arranged to mesh with said rack; a lever operated from said pinion; a spring arranged to resist the movement of said lever for a portion of its travel and assist its movement for another portion thereof so as to cause said rack to have a more extended movement than said pin; a sleeve enclosing said spring and pivoted at its one extremity; a head in said sleeve; and a spring rod terminating in a piston at its one extremity and secured to said lever at its other extremity so as to compress said spring between said piston and the head of said sleeve.

5. A pressure operated reciprocating motor comprising a supporting frame, an operating cylinder carried at one end of said frame; a piston rod extending from said operating cylinder through said frame; a slide valve arranged to control said operating cylinder; a valve rod extending from said slide valve; a track carried by said frame adjacent said piston rod; a rack arranged to slide on said track and operate said valve rod at predetermined times; a projection in said piston rod adapted to engage said rack at predetermined times; a pinion carried by said frame in mesh with said rack and a spring arranged to be compressed by the motion of said pinion for a portion of its travel and adapted to rotate said pinion for another portion of its travel.

In testimony whereof, I affix my signature.

JUL BINDERUP.